(12) United States Patent
Vonsovici et al.

(10) Patent No.: US 7,684,655 B2
(45) Date of Patent: Mar. 23, 2010

(54) ELECTRO-OPTIC MODULATOR

(75) Inventors: Adrian Petru Vonsovici, London (GB); Ian Edward Day, Headington (GB)

(73) Assignee: Kotura, Inc., Monterey Park, CA (US)

(*) Notice: Subject to any disclaimer, the term of this patent is extended or adjusted under 35 U.S.C. 154(b) by 601 days.

(21) Appl. No.: 10/468,938

(22) PCT Filed: Feb. 22, 2002

(86) PCT No.: PCT/GB02/00773

§ 371 (c)(1),
(2), (4) Date: Jul. 15, 2004

(87) PCT Pub. No.: WO02/069025

PCT Pub. Date: Sep. 6, 2002

(65) Prior Publication Data

US 2005/0123227 A1    Jun. 9, 2005

(30) Foreign Application Priority Data

| Feb. 22, 2001 | (GB) | ................................ 0104384.3 |
| Mar. 13, 2001 | (GB) | ................................ 0106092.0 |
| Mar. 14, 2001 | (GB) | ................................ 0106338.7 |
| Mar. 27, 2001 | (GB) | ................................ 0107613.2 |
| Sep. 27, 2001 | (GB) | ................................ 0123245.3 |

(51) Int. Cl.
  *G02F 1/035* (2006.01)
  *G02B 6/10* (2006.01)
  *G02F 1/01* (2006.01)
  *G02B 21/06* (2006.01)

(52) U.S. Cl. ................ 385/2; 385/3; 385/130; 257/431; 257/432; 257/436; 257/458; 257/536; 257/537; 257/538; 257/248; 359/288; 359/289; 359/385

(58) Field of Classification Search ........ 385/2, 385/3, 130
See application file for complete search history.

(56) References Cited

U.S. PATENT DOCUMENTS 5,908,305 A * 6/1999 Crampton et al. ............ 438/141
6,096,566 A * 8/2000 MacPherson et al. ........... 438/4
6,316,281 B1 * 11/2001 Lee et al. ....................... 438/31
2004/0202422 A1 * 10/2004 Gunn, III .......................385/37

FOREIGN PATENT DOCUMENTS

| GB | 2 265 252 A | 9/1993 |
| GB | 2 340 616 A | 2/2000 |
| WO | WO 00/10039 | 2/2000 |
| WO | WO 00/10039 A1 * | 2/2000 |

OTHER PUBLICATIONS

Orobtchouk, R et al. Quasi-$TE_{oo}$ singlemode optical waveguides for electro-optical modulation at 1.3 um using standard SIMOX material, *IEEE Proceeding: Optoelectronics*. vol. 144(2):83-86 (Apr. 4, 1997).

* cited by examiner

*Primary Examiner*—Frank G Font
*Assistant Examiner*—Erin D Chiem
(74) *Attorney, Agent, or Firm*—Gavrilovich, Dodd & Lindsey, LLP

(57) ABSTRACT

An electro-optic device includes a semiconducting layer in which is formed a waveguide, a modulator formed across the waveguide comprising a p-doped region to one side and an n-doped region to the other side of the waveguide, wherein at least one of the doped regions extends from the base of a recess formed in the semiconducting layer. In this way, the doped regions can extend further into the semiconducting layer and further hinder escape of charge carriers without the need to increase the diffusion distance of the dopant and incur an additional thermal burden on the device. In an SOI device, the doped region can extend to the insulating layer. Ideally, both the p and n-doped regions extend from the base of a recess, but this may be unnecessary in some designs. Insulating layers can be used to ensure that dopant extends from the base of the recess only, giving a more clearly defined doped region. The (or each) recess can have non-vertical sides, such as are formed by v-groove etches, A combination of a vertical sidewall at the base of the recess and a non-vertical sidewall at the opening could be used.

18 Claims, 6 Drawing Sheets

ELECTRO-OPTIC MODULATOR

RELATED APPLICATIONS

This application is a 35 U.S.C. 371 national stage filing of International Application No. PCT/GB02/00773, filed 22 Feb. 2002, which claims priority to Great Britain Patent Application No. 0104384.3 filed on 22 Feb. 2001; Great Britain Patent Application No. 0106092.0 filed on 13 Mar. 2001; Great Britain Patent Application No. 0106338.7 filed on 14 Mar. 2001; Great Britain Patent Application No. 0107613.2 filed on 27 Mar. 2001; and Great Britain Patent Application No. 0123245.3 filed on 27 Sep. 2001, all in Great Britain. The contents of the aforementioned applications are hereby incorporated by reference.

TECHNICAL FIELD

The present invention relates to an electro-optic modulator.

BACKGROUND OF THE INVENTION

Electro-optic modulators influence an optical mode and are understood to work by affecting the complex refractive index of a semiconductor waveguide and thereby affecting the transmission of light propagating therein. In such a device, a p-i-n diode normally is formed across the waveguide and injects charge carriers into the region in which the mode is propagating. The presence of significant numbers of charge carriers affects the local refractive index and thus the speed of light transmission. This effect can be used in switches, interferometers etc.

In SOI (Silicon On Insulator) optical devices the mode propagates in a silicon layer over an insulating layer supported on a substrate. The insulating layer can then act as a confinement layer for the charge carriers in the vertical direction. However, it has been found that significant numbers of charge carriers still escape laterally, and this adversely affects both the performance of the device and its reproducibility.

SUMMARY OF INVENTION

The present invention therefore provides, in its first aspect, an electro-optic device including a semiconductor layer in which is formed a waveguide, a modulator formed across the waveguide comprising a doped region on either side, a lower confinement structure for charge carriers beneath the waveguide, lateral confinement structures for charge carriers on either side of the waveguide which extend to the lower confinement structure, at least one of the lateral confinement structures being the doped region to that side of the waveguide, the doped region extending to the lower confinement structure.

Preferably the semiconducting layer comprises silicon, more preferably crystalline silicon. The lower confinement structure preferably comprises an electrically insulating layer. The lower confinement structure for charge carriers may also comprise an optical confinement structure. It is preferred that the semiconducting layer is formed on an insulating layer supported on a substrate, e.g. an SOI device. In this case, the insulating layer can provide the lower confinement structure.

It is naturally preferred that both lateral confinement structures are provided by respective p and n-doped regions either side of the waveguide. However, there may at times be no need or no motivation to do so on one particular side, for example if there are adjacent structures which themselves may provide electrical confinement.

The lateral confinement structures and/or the doped regions (where the two are distinct) can extend from the base of a recess in the semiconducting layer to the insulating layer; preferably they extend from the base only of such a recess.

The waveguide is normally covered by an insulating layer to ensure a distinct refractive index step, confining the optical mode, and to reduce unwanted electrical effects. This insulating layer can extend to and down at least one side of the recess, which if put in place prior to doping will ensure that dopant extends from the base of the recess only, giving a more clearly defined doped region.

The (or each) recess can have non-vertical sides, such as are formed by v-groove etches, which method of manufacture has the advantage that metal contacts leading to the doped regions will be less prone to failure due to thinning at the edge of the recess. A combination of a vertical sidewall at the base of the recess and a non-vertical sidewall at the opening could be used.

In a standard lateral p-i-n diode structure, the doped region to one side is p-type and the doped region to the other side of the waveguide is n-type. Other diode geometries exist, however, and other electrical structures such as transistors can be provided.

Confining structures are used in the present invention to inhibit the escape of charge carriers from the region of interest. Physical structures such as deep trenches, insulating layers and the like will provide confinement. In addition, we have found that a doped region provides confinement. It is thought that opposite charges are confined by a recombination process and like charges are confined by the concentration gradient established by the dopant.

In its second aspect, the present invention provides an electro-optic device including a semiconducting layer in which is formed a waveguide, a modulator formed across the waveguide comprising a doped region on either side, wherein at least one of the doped regions extends from the base only of a recess formed in the semiconducting layer.

In this way, the doped regions can extend further into the semiconducting layer and further hinder escape of charge carriers laterally within the semiconductor layer. This is however achieved without the need to increase the diffusion distance of the dopant, which would incur an additional thermal burden on the device. Further, limitation of the dopant area to the base of the recess reduces the lateral spread of dopant and keeps the volume used for transmission of the optical mode clear of dopant, which if present is apt to cause losses and inefficiency.

As before, an insulating layer, e.g. an oxide layer, can be provided on side walls of the device to inhibit diffusion of dopant therethrough. Alternatively, or in addition, the dopant can be implanted in the semiconducting layer.

The waveguide is preferably a rib waveguide, although other designs of waveguide are known and can be used.

A plurality of such lateral modulators can be formed along the length of the waveguide, each being a p-i-n modulator, adjacent modulators being mutually reversed in orientation. This gives a particularly efficient form of modulation. Ideally there will be an even number of modulators, e.g. two, four, six or eight.

Embodiments of the present invention will now be described by way of example, with reference to the accompanying figures, in which;

BRIEF DESCRIPTION OF THE DRAWINGS

FIG. 2b is a plot of the carrier concentration along line A-A of FIG. 2a;

FIG. 5b is a plot of the carrier concentration along line B-B of FIG. 5a;

DETAILED DESCRIPTION

Figure 1:
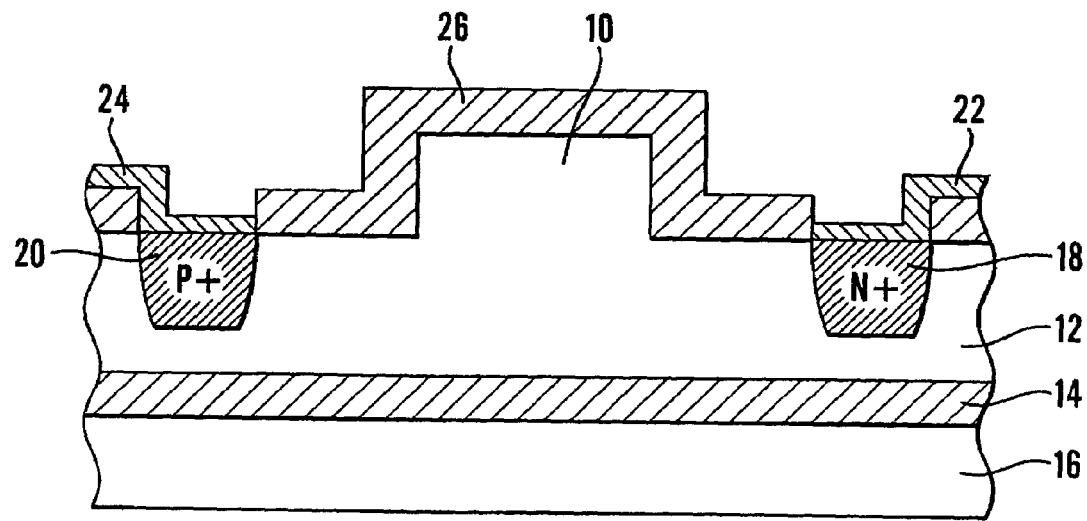
FIG. 1 is a vertical section through a known lateral p-i-n diode modulator.

FIG. 1 shows a standard SOI (silicon-on-insulator) rib waveguide with a lateral injection p-i-n diode made by diffusion into a semiconducting slab. In this arrangement, the waveguide 10 is in the form of a rib on the surface of the silicon epi layer 12. The epi layer 12 is formed on an insulating oxide layer 14 which is itself supported on a substrate 16. On either side of the rib waveguide 10 are a pair of doped regions. To one side there is an n+ doped area 18, and to the other there is a p+ doped area 20. Metal contacts, 22, 24 lead to the doped regions 18, 20 and a p-i-n diode is thus formed. An insulating layer 26, eg of silicon dioxide, is formed over the rib waveguide 10 to provide a more distinct refractive index step and thereby assist in optical confinement, and also beneath the metal contacts 22, 24 away from the doped regions 18, 20 to provide electrical insulation.

FIG. 2 shows a model of the carrier distribution for this device. In the upper region of the graph, the physical structure of the device can be seen in terms of the rib 10, the insulating layer 26 and the metal contacts 22, 24. Within the semiconducting area, the concentration of holes is shown by way of contour lines; the peak hole concentration is $10^{20}$ at point 30 and the minimum is $10^{14}$ at 32. Contours in the intermediate regions are on a logarithmic scale. Details of the electron concentration are not shown as the device is symmetrical and therefore the hole and electron concentrations will be complementary.

It can be seen that in the doped regions 30, 32 there is a significant working concentration of charge carriers. However, there is a distinct gap 34 beneath the doped regions but above the insulating layer 14 where the charge carrier concentration is at a high level, and almost equal to the carrier concentration in the core of the waveguide. This modulation structure is therefore inefficient due to the lack of carrier confinement and poor overlap between the generated high carrier concentration and the optical mode.

Figure 2B:
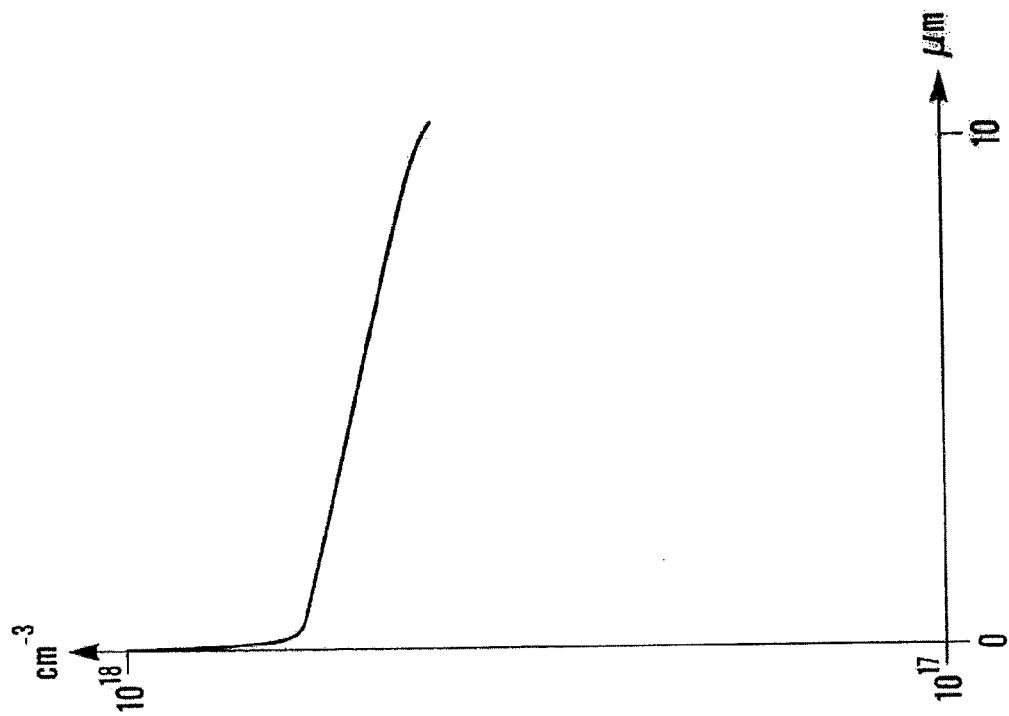

FIG. 2b shows the charge concentration in the area of the optical mode, and on the logarithmic scale it can be seen that the general charge carrier concentration is at approximately $5-6\times10^{17}$ cm$^{-3}$.

Figure 3:
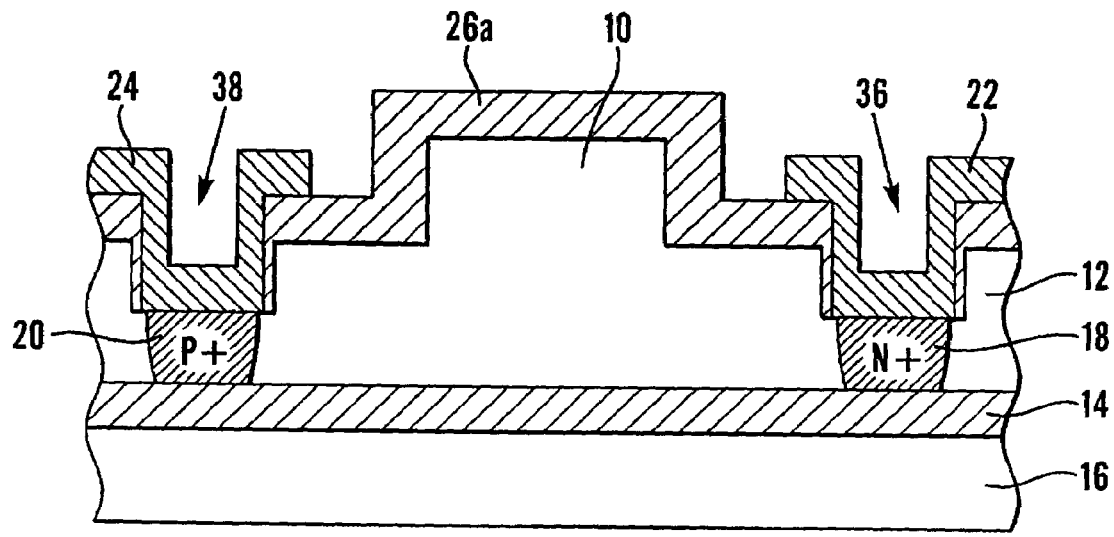
FIGS. 3 and 4 are vertical sections through p-i-n diode modulators being first and second embodiments of the present invention.

FIG. 3 shows the first embodiment of the invention. The rib waveguide 10 is again formed on the silicon epi layer 12 of the SOI structure. However, a pair of trenches 36, 38 are formed either side of the rib waveguide 10 and doping is carried out into these trenches to form an n+ doped area 18 and a p+ doped area 20. Metal contacts 22, 24 are again provided, as is a protective and insulating oxide layer 26.

The increased depth from which the doping is carried out, due to the trenches 36, 38, means that the n+ and p+ doped areas 18, 20 reach the insulating layer 14 beneath the silicon epi layer 12.

Figure 4:
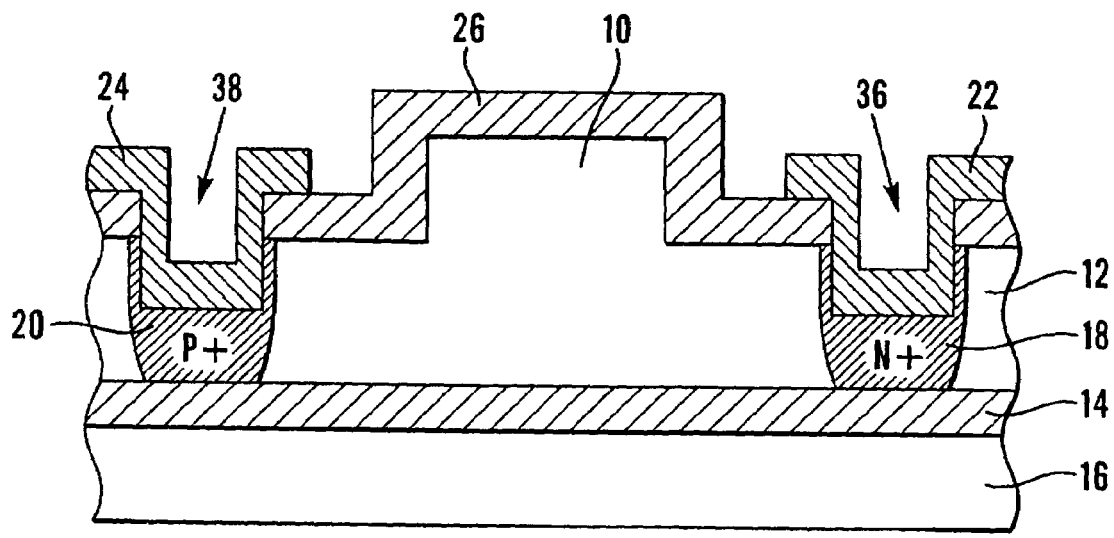

FIG. 4 shows a similar structure according to a second embodiment of the invention. In the first embodiment of FIG. 3, doping is carried out so as to extend from the base of the recesses 36, 38 only. In FIG. 4, this limitation of the extent of doping is not present. These examples could be achieved (for example) by diffusion processes or by ion implantation. In FIG. 3, the protective oxide layer 26a is extended to the sides of the recesses 36, 38 in order to assist in limiting the doped area to the base of the trench.

The dopant profile of FIG. 3 is very advantageous. As the dopant extends only from the base of the trench and not from the sides, the lateral spread of the dopant during drive-in is significantly limited. In addition, the use of the recess from which the dopant extends reduces the amount of drive-in needed, and thus further reduces the lateral spread. Thus, the lateral dimension is more reproducible and more accurately ascertainable. Dopant concentrations in the vicinity of the optical mode can be avoided, reducing losses and inefficiency. The doped regions can be safely moved closer to the optical mode, thereby reducing the dimensions of the device with the attendant advantages thereof.

Figure 2A:
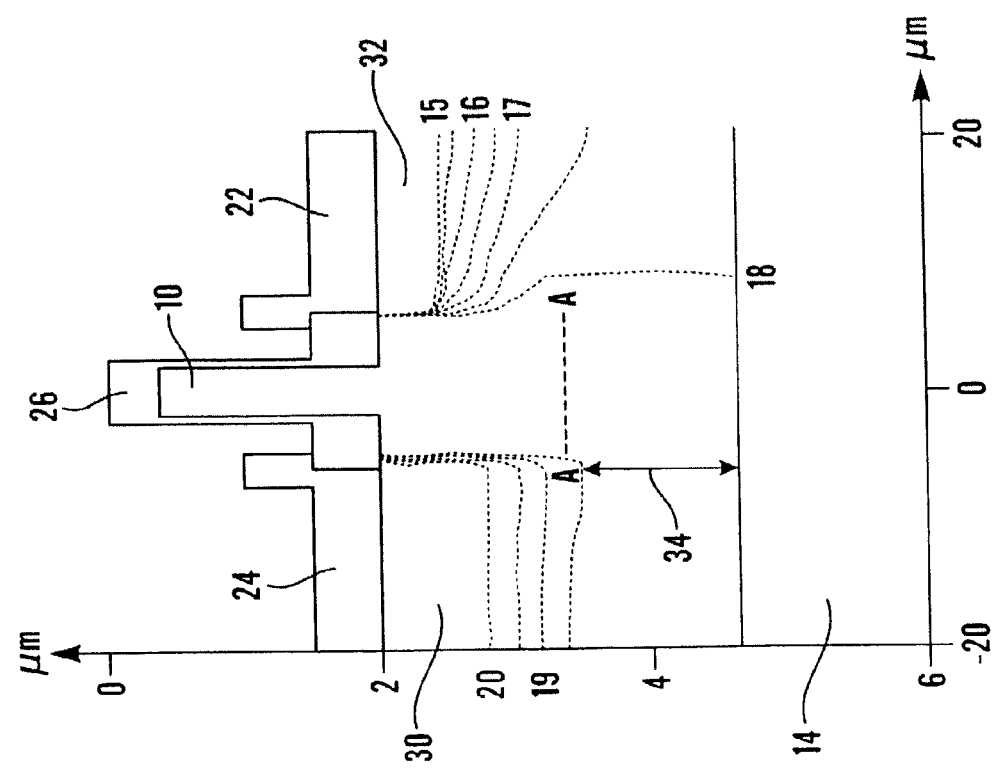
FIG. 2a is a model of the carrier density of the modulator of FIG. 1.
Figure 5B:
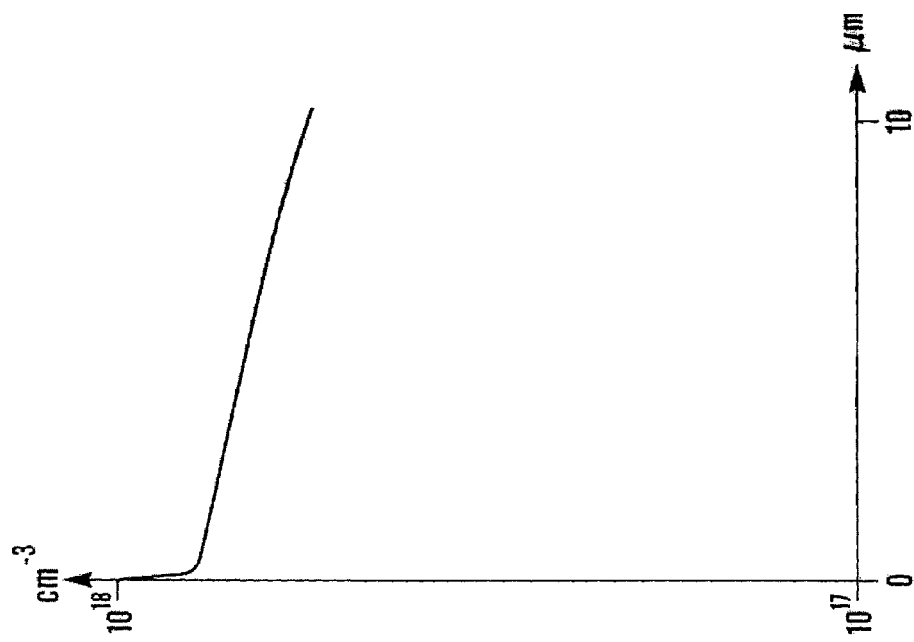
Figure 5A:
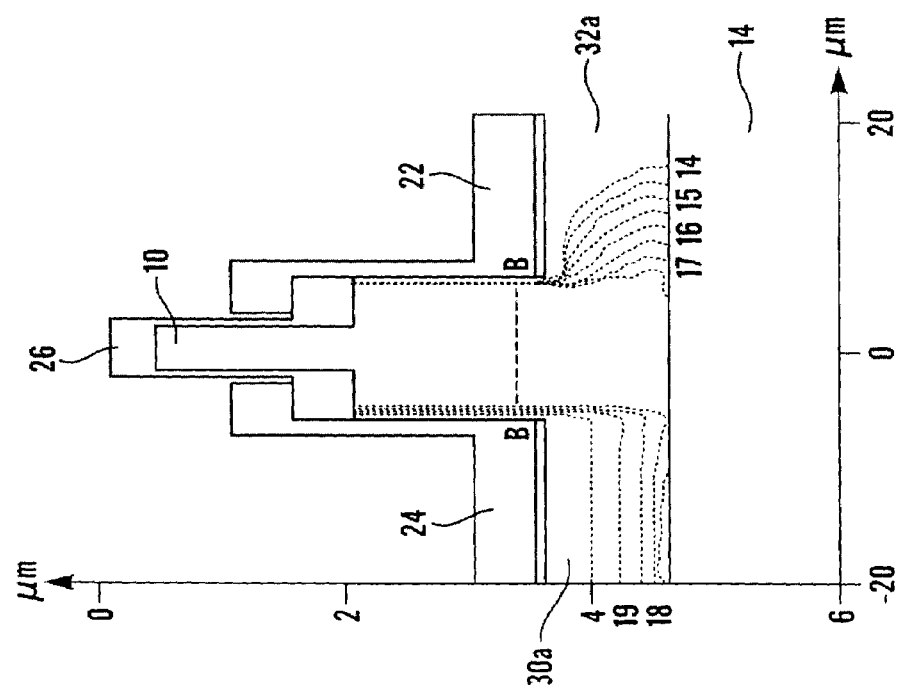
FIG. 5a is a model of the carrier density of the modulator of FIG. 4.

FIG. 5a shows a model of the structure of FIG. 4, displayed on the same basis as FIG. 2a. It can be seen that the areas 30a, 32a of greatest carrier concentration are confined in the structure in that they extend to the underlying insulator layer 14. Thus, carrier escape is prevented in this arrangement and carrier loss must therefore be by recombination. FIG. 5b shows carrier concentration in the area of the optical mode, and it can be seen that on the logarithmic scale this varies between 7 and $8\times10^{18}$ cm$^{-3}$, a detectably higher level than that of FIG. 2b indicating the carriers are not escaping to the same extent.

Figure 5C:
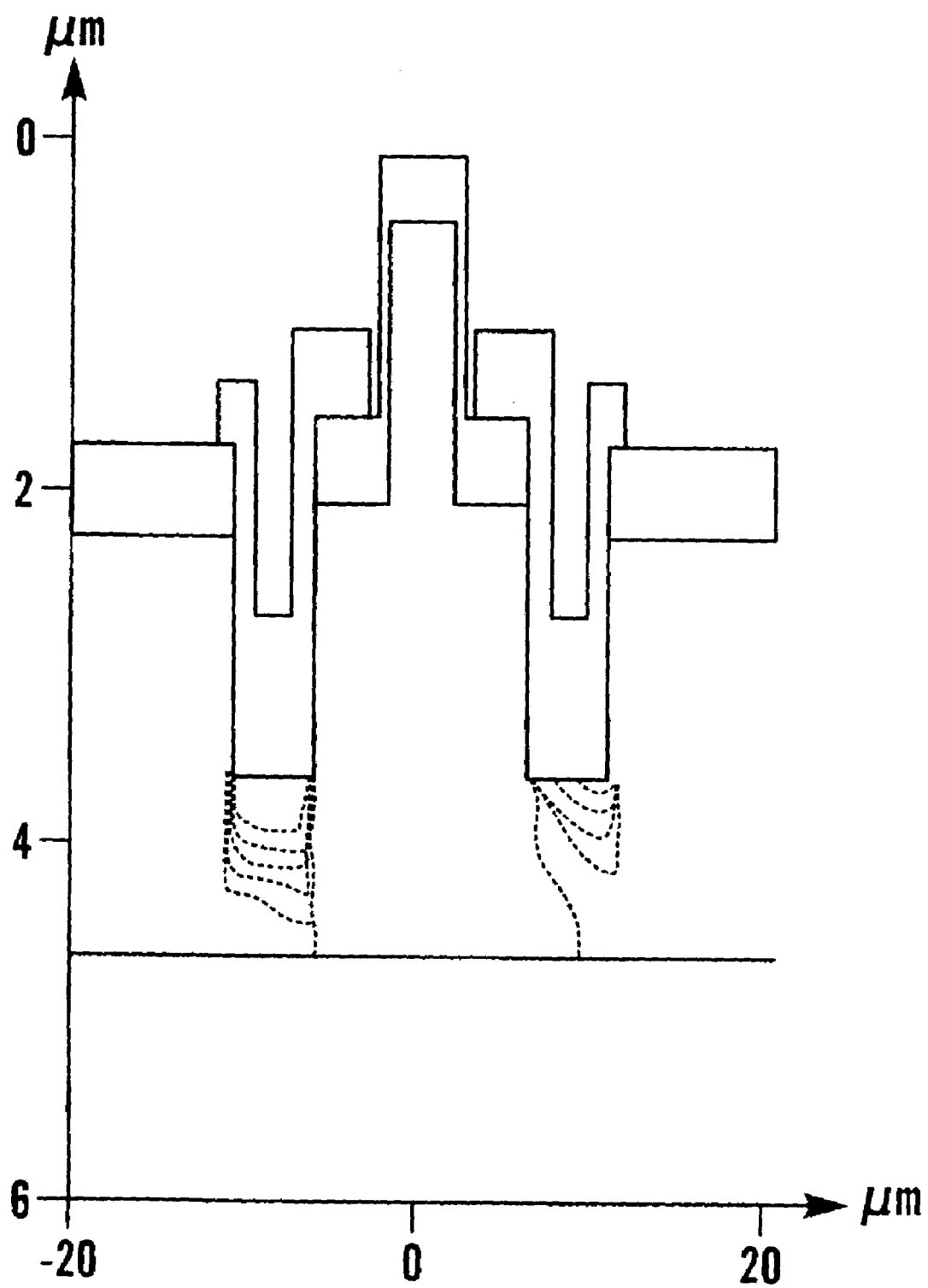
FIG. 5c is a model of the carrier density of the modulator of FIG. 3.

FIG. 5c shows a similar model for the structure of FIG. 3. It can be seen that there is little lateral escape of charge carriers, and little spread of dopant into the optical mode region.

Figure 6:
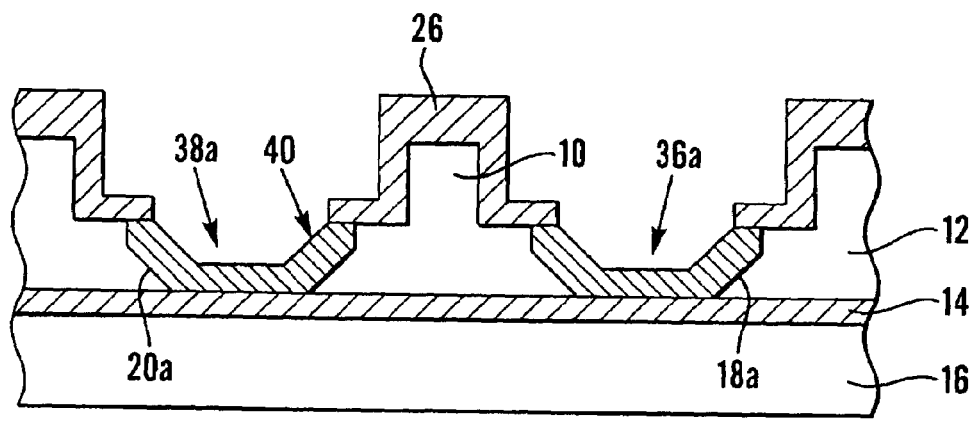
FIG. 6 is a vertical section through a p-i-n diode modulator according to a third embodiment of the present invention.

FIG. 6 shows a third embodiment of the present invention. This corresponds generally to that of FIG. 4 but the trench recesses 36a, 38a are formed with angled edges such as that at 40. This can be achieved via a v-groove etch, for example. This eases the deposition of the metal contacts (not shown in FIG. 6) as they do not need to traverse a sharp corner and are therefore less prone to thinning. Dopant can be confined to the base of the trench if desired.

In order to compare the performance advantage by employing the present invention, a device was fabricated according to FIG. 6 with a 1.8 micron etch on a 2.6 micron slab. A second device was fabricated identically except that the diodes were placed on the surface of the slab region as per FIG. 1. Doping was introduced into both devices using a diffusion process, thus creating two structures which are identical except that the vertical depth of the doping is greater in the novel device.

Figure 7:
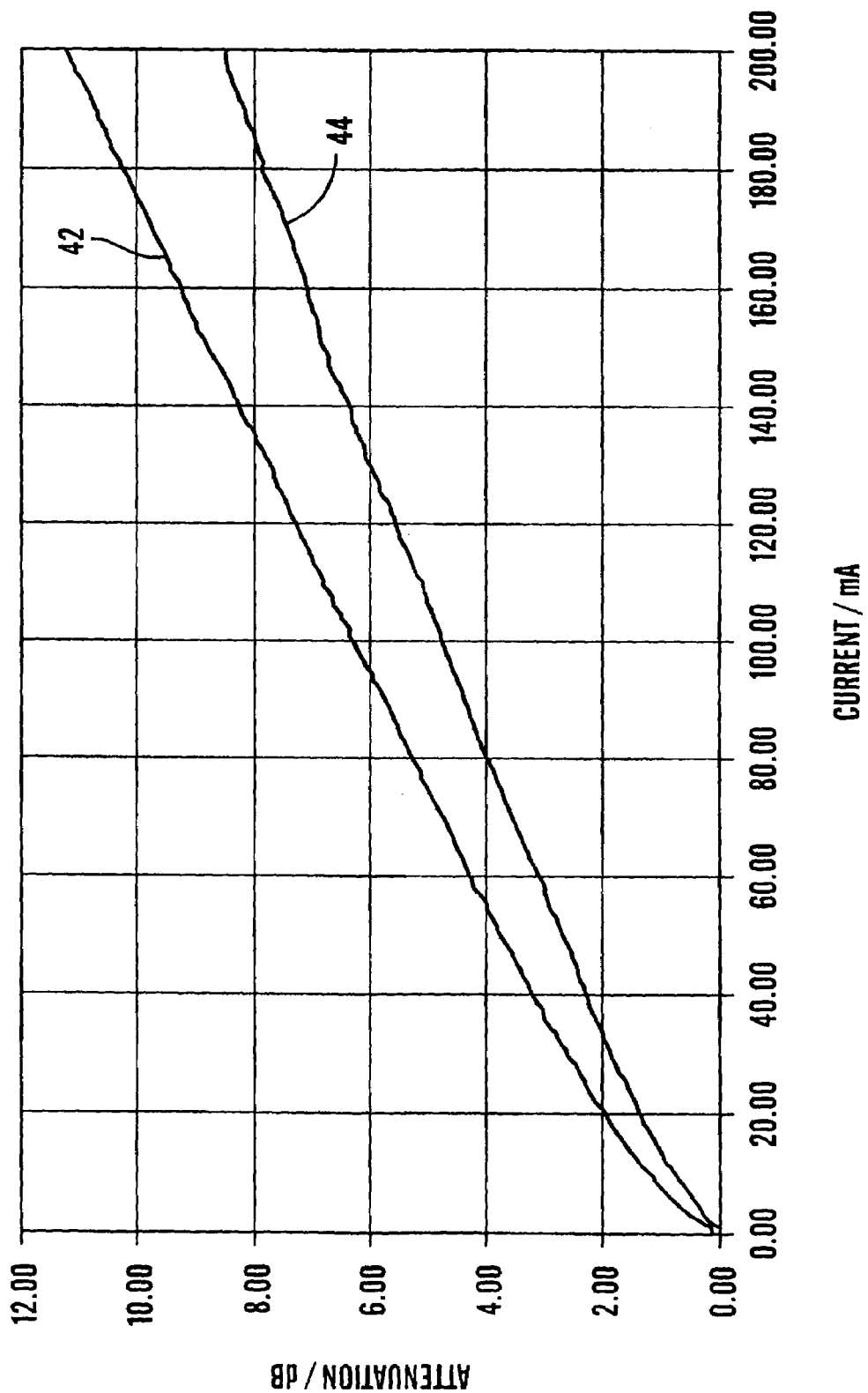
FIG. 7 compares the attenuation of the modulator of FIG. 1 with the modulator of FIG. 6.

The attenuation of light passing through the waveguide due to carrier injection was measured in a 2 mm long diode structure. Attenuation is directly proportional to the carrier concentration injected into the waveguide region by the forward biased diode. The results of this measurement are shown in FIG. 7. Line 42 is for the novel structure whereas line 44 is for the comparative structure without recesses. It can be seen that for any given current, the attenuation achieved for the novel diode 42 is approximately 40% greater than for the standard structure of FIG. 1. Therefore, it can be inferred that the carrier concentration in the waveguide must also be greater in the novel diode structure as generally predicated by the modeling shown in FIGS. 2-5. Alternatively, to achieve the same level of attenuation a lower injection current is required thereby giving a lower power drain and less local heating. In a further alternative the same attenuation can be achieved for the same current using a physically smaller modulator structure.

The above-described embodiments have all been SOI structures. It is to be expected that application of the invention to non-SOI devices will still give enhanced results although an alternative lower confinement structure will need to be provided.

Further, the above embodiments concentrate on single p and single n junction devices, whereas other diode geometries and other electrical structures such as transistors could also be considered.

It will be appreciated that many variations can be made to the above-described embodiments, without departing from the scope of the present invention.

The invention claimed is:

1. An electro-optic device, comprising:
a semiconductor layer having a ridge extending upwards from slab regions positioned on opposing sides of the ridge,
the semiconductor region having a lower ridge region positioned under the ridge and between the slab regions,
the ridge defining a portion of a waveguide configured to guide light though the semiconductor layer;
a modulator across the waveguide,
the modulator including doped regions of the semiconductor layer,
the doped regions being on opposing sides of the ridge;
a lower confinement structure for charge carriers, the lower confinement structure being beneath the waveguide;
lateral confinement structures for charge carriers, the lateral confinement structures being on opposing sides of the ridge, at least one of the doped regions serving as one of the lateral confinement structures; and
recesses that each extends into an upper surface of one of the slab regions such that each recess is positioned between the lower ridge region and a portion of the slab region into which the recess extends,
each recess extending only part way into the semiconductor layer,
the recesses being on opposing sides of the ridge,
each of the doped region extending from a bottom of one of the recesses down to the lower confinement structure.

2. The device of claim 1, wherein each of the doped regions serves as one of the lateral confinement regions.

3. The device of claim 1, wherein the semiconducting layer is on an insulating layer supported on a substrate.

4. The device of claim 3, wherein the insulating layer is the lower confinement structure.

5. The device of claim 4, wherein each of the lateral confinement structures extends from the bottom of one of the recesses down to the insulating layer.

6. The device of claim 5, wherein each recess is defined by a bottom side and lateral sides and each lateral confinement structure extends from the bottom side of one of the recesses without extending from any of the lateral sides of one of the recesses.

7. The device of claim 1, wherein the ridge is covered by an insulating layer.

8. The device of claim 7, wherein the insulating layer extends from the ridge into one of the recesses.

9. The device of claim 1, wherein one of the doped regions is a p-type doped region and another one of the doped regions is an n-type doped region and the n-type doped region and the p-type doped region are positioned on opposing sides of the ridge.

10. The device of claim 1, wherein the waveguide is a rib waveguide.

11. The device of claim 10, wherein the modulator is one of four modulators on the device.

12. The device of claim 1, wherein the semiconducting layer comprises silicon, preferably crystalline silicon.

13. The device of claim 1, wherein each of the recesses is spaced apart from the ridge such that a side of the ridge does not extend into the recess.

14. The device of claim 1, wherein each doped region extends from the bottom of one of the recesses down to the lower confinement structure such that the each doped region spans a distance between the bottom of one of the recesses and the lower confinement structure.

15. The device of claim 1, wherein the recesses are each defined by a bottom side and by lateral sides.

16. The device of claim 1, wherein the bottom side of each is recess is parallel to a top side of the slab region.

17. The device of claim 1, wherein the slab regions and the ridge are included in a single and continuous piece of material.

18. The device of claim 1, wherein each recess is configured such that the upper surface of the slab region into which the recess extends is positioned on opposing sides of an opening to the recess.

* * * * *